United States Patent
Coffman et al.

(10) Patent No.: US 11,370,075 B2
(45) Date of Patent: Jun. 28, 2022

(54) EXPENDED LANCE TOOL HOLDER FOR MINIMUM QUANTITY LUBRICATION

(71) Applicant: Ford Global Technologies, LLC, Dearborn, MI (US)

(72) Inventors: David Garrett Coffman, Warren, MI (US); Ethan Timothy Hughey, Royal Oak, MI (US); David Alan Stephenson, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/598,437

(22) Filed: Oct. 10, 2019

(65) Prior Publication Data

US 2021/0107107 A1    Apr. 15, 2021

(51) Int. Cl.
*B23Q 11/10*    (2006.01)

(52) U.S. Cl.
CPC ................. *B23Q 11/1023* (2013.01)

(58) Field of Classification Search
CPC .... B23Q 11/1023; B23Q 11/1046; B23C 5/28
See application file for complete search history.

(56) References Cited

U.S. PATENT DOCUMENTS

| | | | |
|---|---|---|---|
| 6,981,825 B2 | 1/2006 | Sugata et al. | |
| 8,876,442 B2 | 11/2014 | Saito et al. | |
| 10,252,390 B2 | 4/2019 | Aygün et al. | |
| 2008/0185793 A1* | 8/2008 | Haimer | B23B 31/1179 279/2.06 |

FOREIGN PATENT DOCUMENTS

| | | | | |
|---|---|---|---|---|
| DE | 19655334 B4 * | 5/2006 | ......... | B23Q 11/1046 |
| WO | WO-03106104 A1 * | 12/2003 | ......... | B23Q 11/1046 |
| WO | WO-2009135660 A1 * | 11/2009 | ......... | B23Q 11/1023 |

OTHER PUBLICATIONS

English translation of DE 19655334 B4 (Year: 2006).*
English translation of WO 2009135660 (Year: 2009).*
Chaurasia et al., Review Paper on Oil Mist Lubrication, International Journal of Engineering Research and Application, vol. 8, Issue 5 (Part-V), pp. 34-37, May 2018.

* cited by examiner

*Primary Examiner* — Alan Snyder
(74) *Attorney, Agent, or Firm* — Burris Law, PLLC

(57) ABSTRACT

A tool holder for a minimum quantity lubrication (MQL) device includes a tool holder body, a mixing chamber, a gas passageway, and an oil passageway. The tool holder body is configured for rotation about an axis. The tool holder body has a proximal end configured to be coupled to a spindle of the MQL device and a distal end configured to support a cutting tool for rotation about the axis. The mixing chamber is disposed within the tool holder body. The gas passageway is within the tool holder body and in fluid communication with the mixing chamber. The oil passageway is within the tool holder body and in fluid communication with the mixing chamber. The oil passageway is separate from the gas passageway and configured to receive a liquid lubricant from an oil conduit of the spindle.

19 Claims, 5 Drawing Sheets

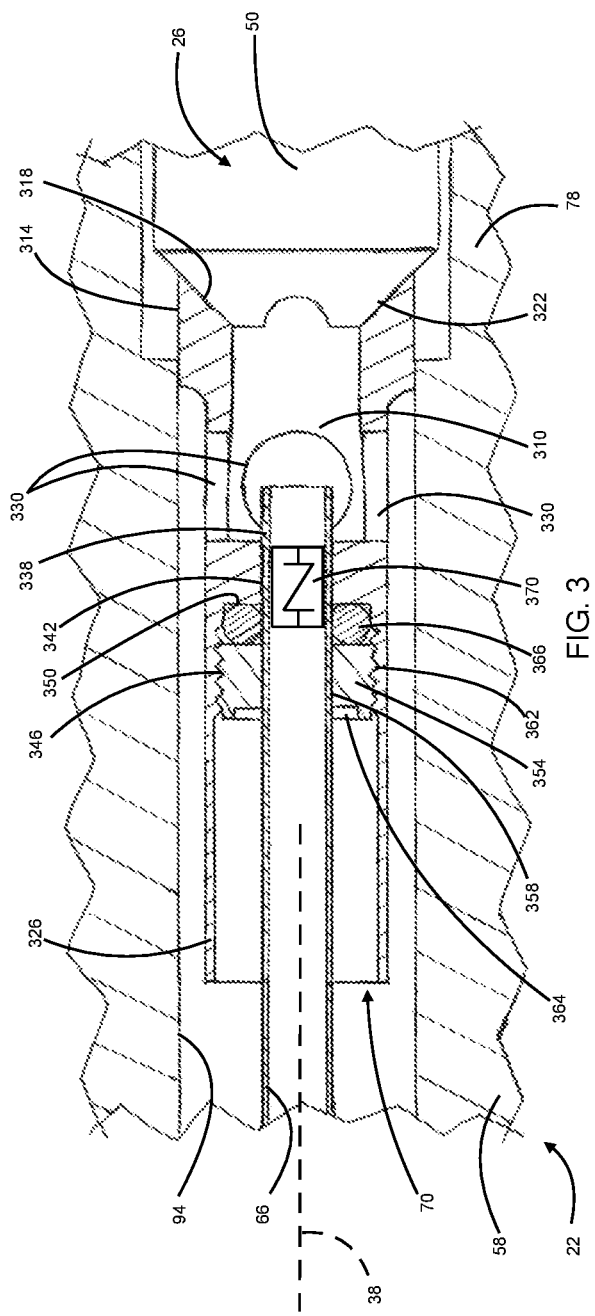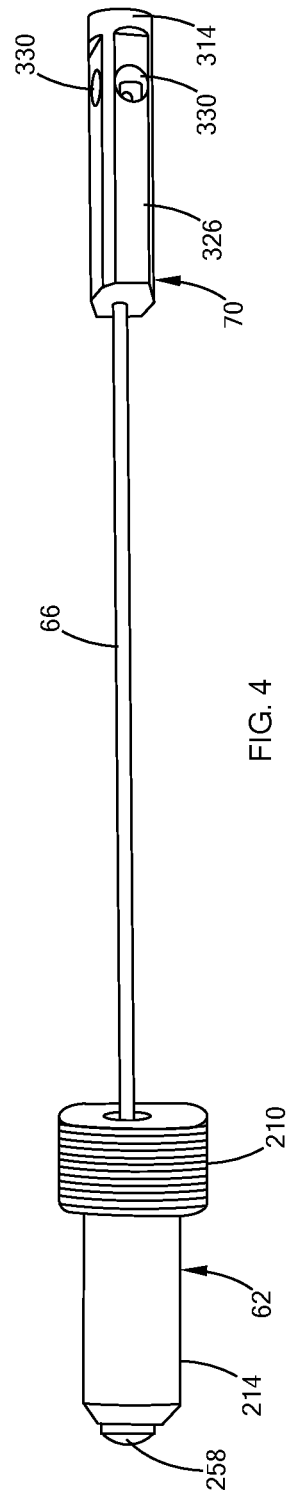

EXPENDED LANCE TOOL HOLDER FOR MINIMUM QUANTITY LUBRICATION

FIELD

The present disclosure relates to a cutting tool holder and more specifically to oil delivery in a minimum quantity lubrication cutting tool holder.

BACKGROUND

The statements in this section merely provide background information related to the present disclosure and may not constitute prior art.

Conventional machining uses high volume flow of a liquid lubricant over the cutting edges of the tool. Some tools having multiple cutting diameters have internal passages that provide this liquid lubricant to each cutting edge. Since the conventional liquid lubricant is essentially an incompressible fluid, flow from each passage to each cutting edge remains substantially based on the pressure of the liquid supplied to the tool.

In contrast, minimum quantity lubrication ("MQL") machining uses lubrication supplied to the cutting edges of a tool through a lean air-oil mist (i.e., an aerosol), rather than through the high-volume liquid-based emulsion in conventional machining. The ratio of air to oil in the air-oil mist is typically very high and the lubricant mist acts as a compressible fluid (unlike the incompressible liquid lubricant of conventional machining). An MQL tool holder is rotated about an axis by a spindle and typically holds the cutting tool for rotation about the axis while delivering the lubricant mist to the cutting tool. In one channel systems, the tool holder receives the lubricant from the spindle in the pre-mixed mist form and the mist travels through the holder to the tool. In two channel systems, the oil and air travel through the spindle separately and are released directly from the spindle into a chamber of the tool holder where they mix immediately upon receipt in the tool holder. The mist then travels through the tool holder to the tool. One issue with both types of systems includes oil depositing along an inner wall of the pathway of the tool holder. This can reduce the efficiency of the tool and can increase the time needed before the desired ratio of air to lubricant exits the tool.

The present disclosure addresses these and other issues associated with MQL tool holders.

SUMMARY

This section provides a general summary of the disclosure and is not a comprehensive disclosure of its full scope or all of its features.

In one form, a tool holder for a minimum quantity lubrication (MQL) device includes a tool holder body, a mixing chamber, a gas passageway, and an oil passageway. The tool holder body is configured for rotation about an axis. The tool holder body has a proximal end configured to be coupled to a spindle of the MQL device and a distal end configured to support a cutting tool for rotation about the axis. The mixing chamber is disposed within the tool holder body. The gas passageway is within the tool holder body and in fluid communication with the mixing chamber. The oil passageway is within the tool holder body and in fluid communication with the mixing chamber. The oil passageway is separate from the gas passageway and configured to receive a liquid lubricant from an oil conduit of the spindle. According to a variety of alternate forms: the gas passageway and oil passageway are coaxial with the axis; the gas passageway is disposed coaxially about the oil passageway within the tool holder body; the tool holder further includes a lance seal configured to seal with the oil conduit of the spindle; the tool holder further includes a receiver, a lance and a mixing head, wherein the lance couples the receiver to the mixing head, wherein the tool holder body defines a gas chamber through which the lance extends, and wherein the mixing head defines the mixing chamber; the receiver is mounted within the proximal end of the tool holder body and defines an oil inlet and an gas inlet, the oil inlet being in fluid communication with the lance and configured receive liquid lubricant from the oil conduit of the spindle, wherein the gas inlet is in fluid communication with the gas chamber and is configured to receive a gas from a gas conduit of the spindle; the receiver is threadably mounted within the tool holder body; the mixing head defines an aperture that provides fluid communication between the gas chamber and the mixing chamber; the mixing head defines a seat face configured to engage a mating face of a cutting tool; the seat face is a conical surface; the mixing head is slidably received in the tool holder body; an axial position of the mixing head is adjustable relative to the lance; the tool holder further includes a nut and a seal member, the seal member forming a seal between the lance and the mixing head, the nut being threadably engaged with the mixing head and configured to compress the seal between the lance and the mixing head to inhibit axial movement of the mixing head relative to the lance; the lance includes a one-way valve; the tool holder further includes a one-way valve disposed in the oil passageway; a minimum quantity lubrication (MQL) device includes the tool holder.

In another form, a minimum quantity lubrication (MQL) device includes a spindle body, an oil conduit, a gas conduit, and a tool holder. The spindle body is configured to rotate about an axis. The tool holder assembly includes a tool holder body, a mixing head, and a lance. The tool holder body is mounted to the spindle body for common rotation about the axis. The mixing head is disposed within the tool holder body and defines a mixing chamber. The lance extends within the tool holder body. A first end of the lance is configured to receive oil from the oil conduit. A second end of the lance is configured to deliver oil to the mixing chamber. According to a variety of alternate forms: the oil conduit extends through the spindle body coaxial with the axis and the gas conduit extends through the spindle body coaxially about the oil conduit; the mixing head defines a face configured to engage a mating face of a cutting tool; one of the lance and the mixing head includes a valve configured to permit flow of oil in the lance in a first direction toward the mixing chamber and inhibit flow in an opposite direction; an axial position of the mixing head is adjustable relative to the lance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a cross-sectional view of another portion of the tool holder assembly of FIG. 1;

FIG. 4 is a side view of a portion of the tool holder assembly of FIG. 1, illustrating a receiver, lance, and mixing head in accordance with the teachings of the present disclosure;

Figure 1:
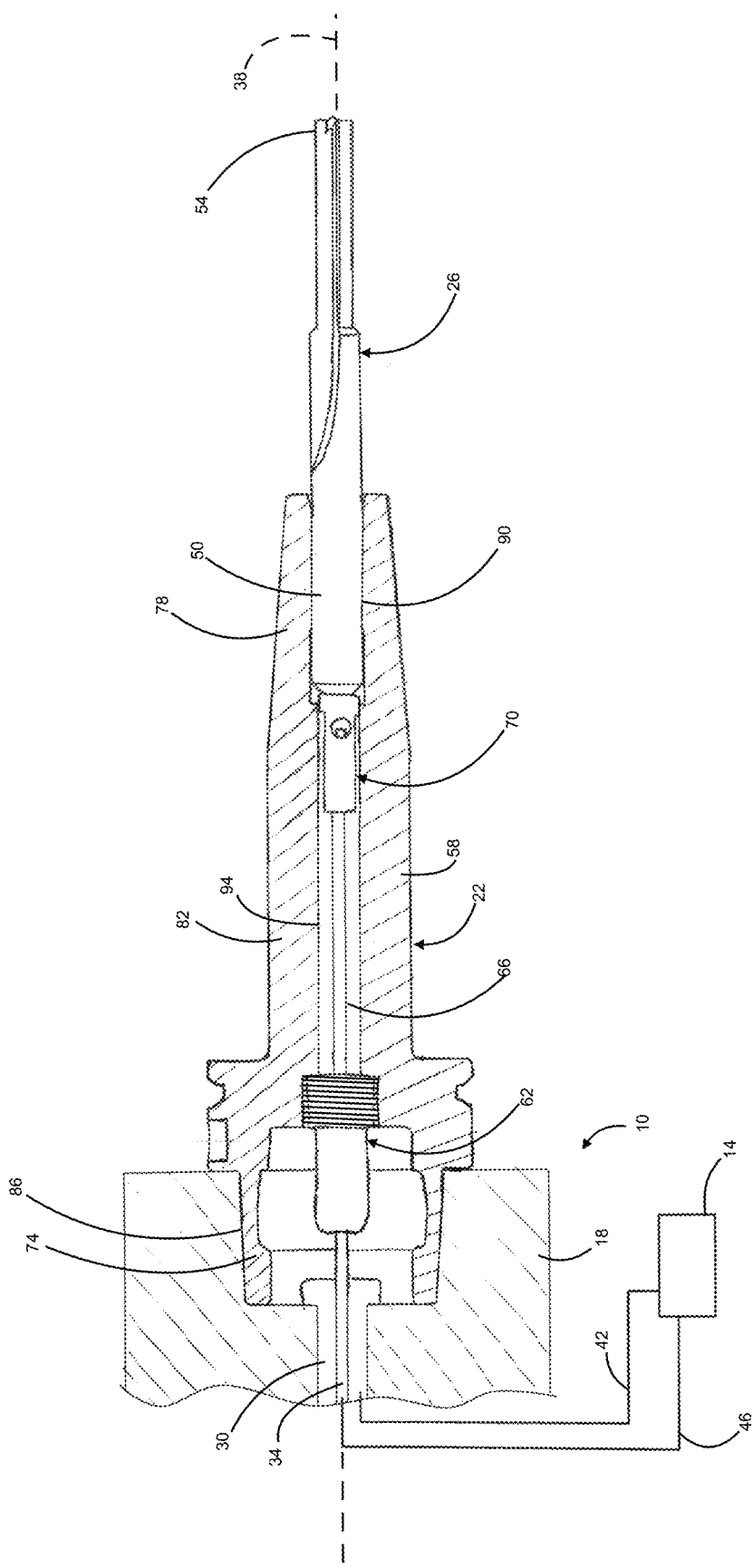
FIG. 1 is a schematic cross-sectional view of a portion of a cutting machine including a minimum quantity lubrication system and a tool holder assembly in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring to FIG. 1, a portion of a minimum quantity lubrication ("MQL") cutting machine 10 is illustrated. The MQL cutting machine 10 includes an MQL supply system 14, a spindle 18, a motor (not shown), and a tool holder assembly 22 configured to hold a cutting tool 26. In the example provided, the cutting machine 10 also includes a rotary feedthrough (not shown) configured to connect the MQL supply system 14 to the spindle 18 to supply a gas (e.g., air) and a liquid lubricant (e.g., oil) to separate conduits 30, 34 within the spindle 18. The motor (not shown) is configured to rotate the spindle 18 about a central axis 38. In the example provided, the oil conduit 34 is disposed coaxially about the central axis 38 through the spindle 18 and the air conduit 30 is disposed coaxially about the oil conduit 34.

The MQL supply system 14 is a 2-channel MQL system such that the MQL supply system 14 provides oil and compressed air in separate supply conduits 42, 46. Accordingly, the MQL supply system 14 can include an air compressor (not shown) or an inlet (not shown) configured to receive compressed air from a separate compressed air source (not shown), and a regulator (not shown) configured to control a pressure or flow rate of the compressed air. The MQL supply system 14 can include an oil reservoir (not shown) or an inlet (not shown) configured to receive a supply of lubrication oil, and a device (e.g., a pump and/or regulator; not shown) configured to control a pressure or flow rate of the oil.

In the example provided, the air supply conduit 46 and the oil supply conduit 42 connect the MQL supply system 14 to the rotary feedthrough (not shown) for fluid communication therewith. The rotary feedthrough (not shown) does not rotate with the spindle 18 but includes pathways (not shown) that maintain the oil and air separate from each other and provide oil to the oil conduit 34 of the spindle 18 and air to the air conduit 30 of the spindle 18 so that the air and oil can travel separately from the rotary feedthrough (not shown) to the spindle 18 while the spindle 18 is rotating.

The tool holder assembly 22 is mounted to the spindle 18 for common rotation with the spindle 18 and is configured to support a base portion 50 of the cutting tool 26 for common rotation about the central axis 38 while a cutting portion 54 of the cutting tool 26 extends axially from the tool holder assembly 22 to engage a workpiece (not shown). The cutting tool 26 is mounted to the tool holder assembly 22 such that it can be removed and replaced with another or different cutting tool (not shown). The cutting tool 26 can be any suitable type of rotary tool, for example a milling bit, a drill, a tap, or a reamer, among others.

The tool holder assembly 22 generally includes a tool holder body 58, a receiver 62, a lance 66, and a mixing head 70. The tool holder body 58 is disposed about the central axis 38 and includes a driven portion 74, a tool receiving portion 78, and a mid-portion 82 that extends between the driven portion 74 and the tool receiving portion 78. The driven portion 74 is coupled to the spindle 18 to be rotated thereby. In the example provided, the driven portion 74 is received in a recess 86 of the spindle 18 and engaged by the spindle 18 for common rotation about the central axis 38. The mid-portion 82 extends axially from the driven portion 74 and away from the spindle 18. The tool receiving portion 78 includes a bore 90 configured to receive and grip the base portion 50 of the cutting tool 26 for common rotation about the central axis 38. The tool holder body 58 defines a central aperture 94 that extends axially through the tool holder body 58.

Figure 2:
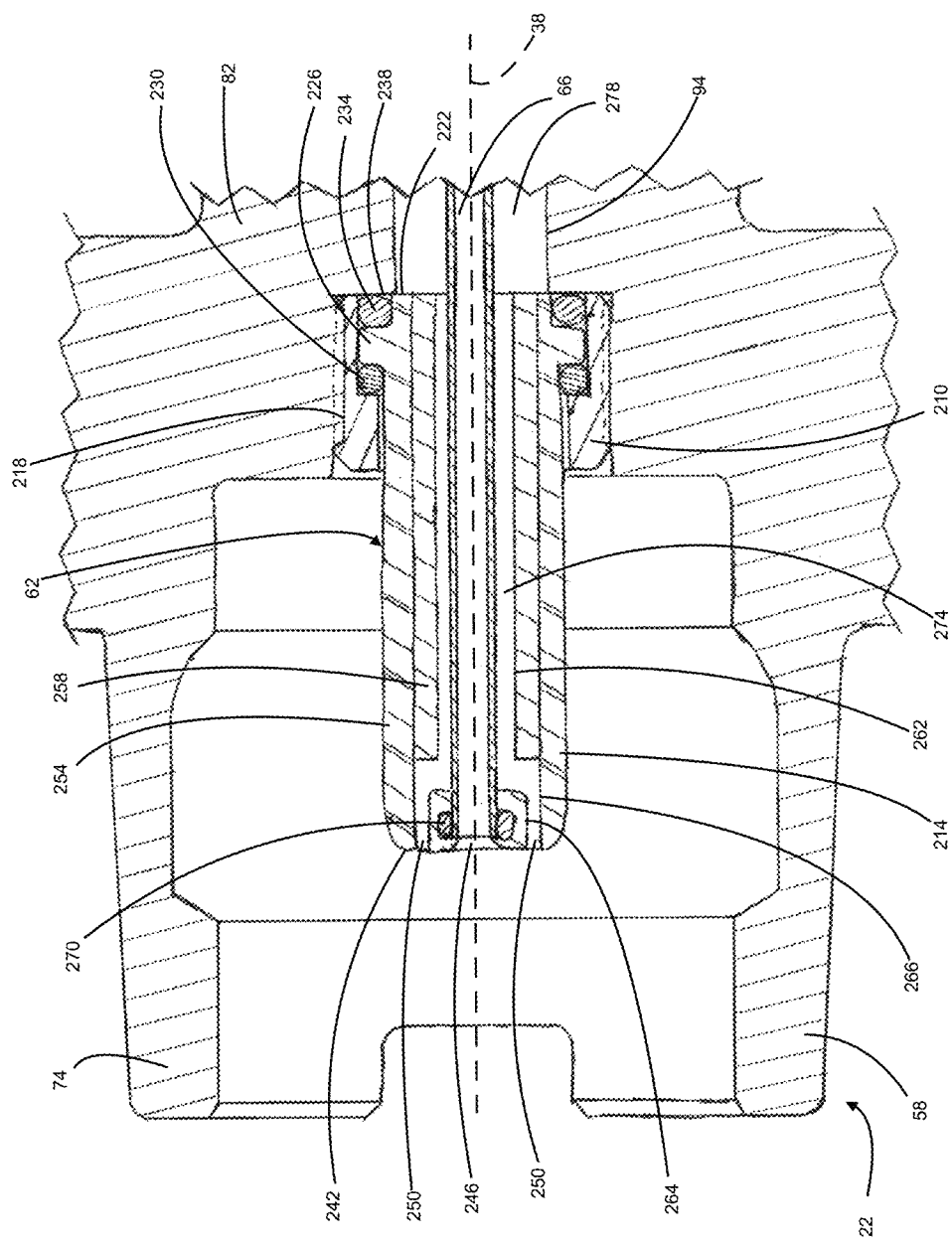
FIG. 2 is a cross-sectional view of a portion of the tool holder assembly of FIG. 1.
Figure 7:
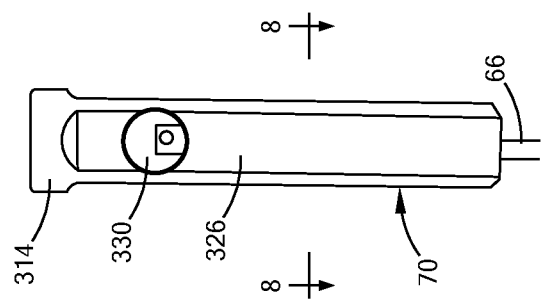
FIG. 7 is a side view of the mixing head and an end of the lance of FIG. 4.
Figure 6:
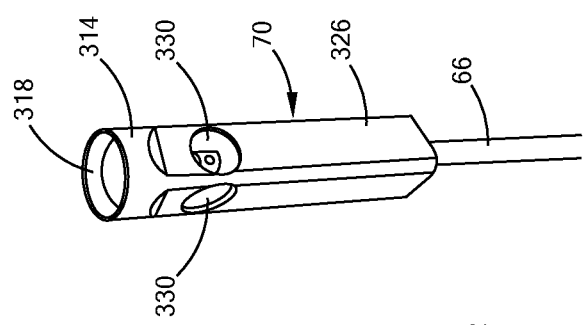
FIG. 6 is a perspective view of the mixing head of FIG. 4.
Figure 5:
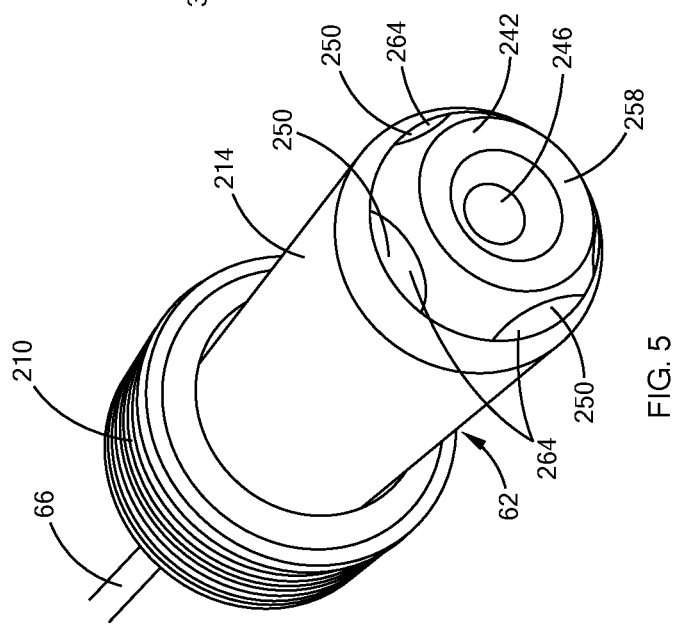
FIG. 5 is a perspective view of the receiver of FIG. 4.

Referring to FIGS. 2, 4, and 5, the receiver 62 is disposed within the central aperture 94 of the tool holder body 58 and configured to receive the air and oil separately from the spindle 18. In the example provided, the receiver 62 includes an externally threaded portion 210 and a tubular portion 214. The externally threaded portion 210 is threadably engaged with internal threads 218 of the tool holder body 58, such as within the driven portion 74 or within the mid-portion 82 proximate to the driven portion 74. In the example provided, a distal end 222 of the tubular portion 214 includes a shoulder 226 that extends about the circumference of the distal end 222 and a pair of O-rings 230, 234 are disposed about the distal end 222 on opposite sides of the shoulder 226 such that the threaded portion 210 compresses the O-ring 230 against the shoulder 226 and the shoulder 226 compresses the O-ring 234 against a surface 238 of the tool holder body 58 when the threaded portion 210 is tightened.

A proximal end 242 of the tubular portion 214 of the receiver 62 defines an oil inlet 246 coaxial with the central axis 38 and at least one air inlet 250 that is radially outward of the oil inlet 246. In the example provided, the tubular portion 214 includes an outer body 254 and an inner body 258 disposed coaxially within and coupled to the outer body 254. However, other configurations can be used. Also, in the example provided, the inner body 258 is press-fit within the outer body 254, though other configurations can be used. In the example provided, the inner body 258 defines a central bore 262 that is open to the air inlets 250 and the air inlets 250 are defined by the space between recessed areas 264 of the outer surface of the inner body 258 and an inner surface 266 of the outer body 254.

The lance 66 is a cylindrical tube disposed coaxially about the central axis 38. The lance 66 extends through the distal end 222 of the tubular portion 214 of the receiver 62 and is in fluid communication with the oil inlet 246. In the example provided, an O-ring 270 forms a seal between the inner body 258 and the lance 66 to inhibit oil from flowing into the central bore 262 of the inner body 258. Thus, the outer surface of the lance 66 and an inner surface of the inner body 258 define an annular chamber 274 through which air travels as it passes through the receiver 62. Air can then exit this annular chamber 274 to an annular chamber 278 defined by the outer surface of the lance 66 and the central aperture 94 of the tool holder body 58.

Referring to FIGS. 3, 4, and 6-8, the mixing head 70 is disposed within the central aperture 94 of the tool holder body 58 and is configured to receive the oil and air separately and mix them into an air-oil mist within a mixing chamber 310. A distal end 314 of the mixing head 70 defines a seat surface 318 configured to sealingly engage a mating surface 322 of the base portion 50 (FIG. 1) of the cutting tool 26 such that the air-oil mist can be supplied to the cutting tool 26. In the example provided, the seat surface 318 and the mating surface 322 are conical in shape, though other configurations can be used. In the example provided, a proximal end 326 of the mixing head 70 is a generally square shape with rounded corners that slidingly fits within the central aperture 94 of the tool holder body 58. Thus, air can flow through gaps 'G' formed between the flats of the square shape and the central aperture 94 of while the corners stabilize the mixing head within the central aperture 94 of the tool holder body 58.

The mixing head 70 defines one or more apertures 330 that allow fluid communication between the gaps 'G' and the mixing chamber 310. In the example provided, each flat of the square shape of the mixing head 70 defines one aperture 330, though other configurations can be used. The distal end 314 of the mixing head 70 is configured to inhibit airflow between the mixing head 70 and the tool holder body 58 such that air is directed into the mixing chamber 310. In the example provided, the distal end 314 of the mixing head 70 is a round shape that can contact the central aperture 94 of the tool holder body 58 such that the distal end 314 and the central aperture 94 may provide a seal. In an alternative configuration, not shown, a separate seal can be used between the distal end 314 of the mixing head 70 and the central aperture 94 of the tool holder body 58.

A distal end 338 of the lance 66 extends into the mixing head 70 to deliver the oil to the mixing chamber 310. In the example provided, the distal end 338 of the lance 66 extends through a central aperture 342 in the mixing head 70 and extends into the mixing chamber 310. In an alternative configuration, the distal end 338 of the lance 66 can terminate in the mixing head 70 before the mixing chamber 310 and the central aperture 342 can deliver the oil to the mixing chamber 310.

In the example provided, an axial position of the mixing head 70 relative to the lance 66 is adjustable to accommodate different axial seating positions with the cutting tool 26. The proximal end 326 of the mixing head 70 has internal threads 346 and a shoulder 350. A jamb nut 354 having a central aperture 358 and external threads 362 is disposed about the lance 66 and is threadably engaged with the internal threads 346 of the mixing head 70. The jamb nut 354 can include a tool engagement feature 364, such as a recess having a hexagonal or other shape configured to be engaged by a tool to tighten the jamb nut 354 within the mixing head 70. An O-ring 366 is disposed about the lance 66 in the space between the jamb nut 354 and the shoulder 350 such that when the jamb nut 354 is tightened, the jamb nut 354 compresses the O-ring 366 against the shoulder 350. Compression of the O-ring 366 causes the O-ring 366 to tighten around the lance 66 to inhibit axial movement of the mixing head 70 relative to the lance 66.

Referring to FIG. 3, a check valve 370 can optionally be included to inhibit oil from draining from the lance when not in use. In the example provided, the check valve 370 is disposed within the distal end 338 of the lance 66. The check valve 370 can be any suitable type of check valve. In an alternative configuration, not shown, the lance 66 can terminate within the mixing head 70 before the mixing chamber 310 and the check valve 370 can be within the mixing head 70 between the lance 66 and the mixing chamber 310. Thus, the lance 66 can remain filled with oil to reduce cycle time by eliminating the need to refill the lance with oil before each use.

Figure 10:
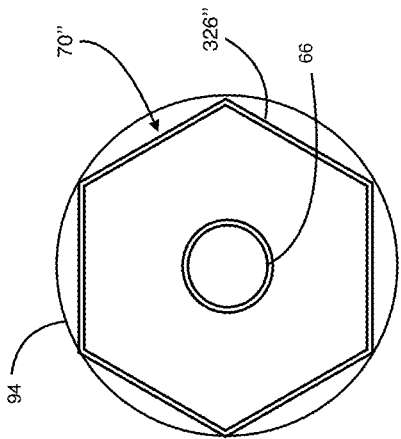
FIG. 10 is a cross-sectional view similar to FIG. 8, illustrating a mixing head of a third configuration.
Figure 9:
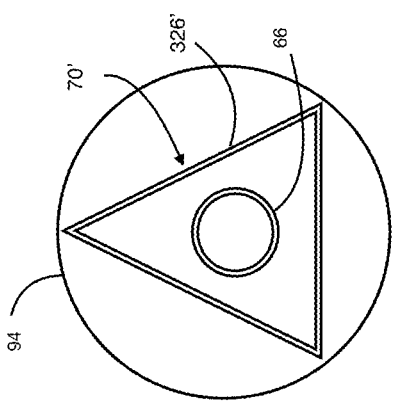
FIG. 9 is a cross-sectional view similar to FIG. 8, illustrating a mixing head of a second configuration.
Figure 8:
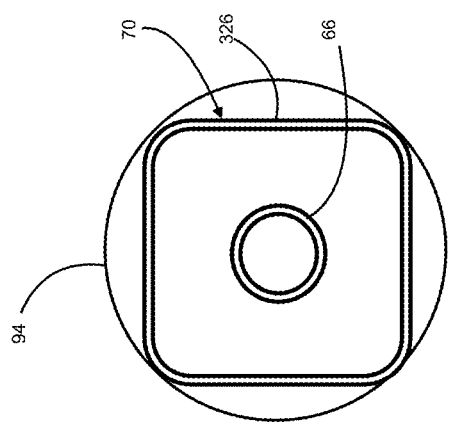
FIG. 8 is a cross-sectional view of the mixing head and lance of FIG. 4 taken along line 8-8 shown in FIG. 7.

Referring specifically to FIGS. 8-10, the proximal end 326 of the mixing head 70 can have shapes other than the square shape illustrated in FIG. 8. FIGS. 9 and 10 illustrate alternative mixing heads 70', 70'', respectively. The mixing heads 70', 70'' are similar to the mixing head 70 of FIG. 8, except as otherwise shown or described herein. Features shown and described herein with primed reference numerals are similar to the features described above by unprimed reference numerals except as otherwise shown or described herein. For example, FIG. 9 illustrates a triangular proximal end 326' of the mixing head 70'. The corners of the triangular shape can stabilize the mixing head 70' within the tool holder body 58 while permitting air to flow between the sides of the triangular shape and the central aperture 94 of the tool holder body 58. The proximal end 326'' of the mixing head 70'' may also have more than four sides, such as a pentagon shape (not shown), a hexagonal shape (shown in FIG. 10), or any number of sides. In an alternative configuration, not shown, the proximal end of the mixing head could have a lobed shape or a splined shape such that air can flow between the central aperture of the tool holder body and the mixing head. In yet another alternative configuration, not shown, the proximal end of the mixing head may have a round shape that fits within the central aperture of the tool holder body and passageways defined by the proximal end of the mixing head can convey the air to the mixing chamber.

The tool holder assembly of the present disclosure maintains the oil and air separately and mixes the oil and air immediately before the base portion of the cutting tool. By reducing the distance the air-oil mixture must travel before reaching the cutting tool, the MQL cutting machine of the present disclosure has reduced cycle time and reduced waste oil over conventional MQL cutting machines.

While O-rings are described herein as forming seals between separate components, other types of seals may be used.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A tool holder for a minimum quantity lubrication (MQL) device, the tool holder comprising:
   a tool holder body configured for rotation about an axis, the tool holder body having a proximal end configured to be coupled to a spindle of the MQL device and a distal end configured to support a cutting tool for rotation about the axis;
   a lance including a first terminal end and a second terminal end; and
   a mixing head defining a mixing chamber disposed within the tool holder body;
   wherein the tool holder body defines a gas passageway disposed about the lance within the tool holder body and in fluid communication with the mixing chamber; and
   wherein the lance extends between the first terminal end and the second terminal end to define an oil passageway within the tool holder body and in fluid communication with the mixing chamber, the oil passageway being separate from the gas passageway, wherein the first terminal end is disposed within the tool holder body and is configured to receive a liquid lubricant from an oil conduit of the spindle, the second terminal end and the gas passageway each being open directly into the mixing head so that mixing of gas from the gas passageway and the liquid lubricant from the oil passageway is configured to take place in the mixing chamber,
   wherein the axial position of the mixing head is adjustable relative to the lance.

2. The tool holder according to claim 1, wherein the gas passageway and oil passageway are coaxial with the axis.

3. The tool holder according to claim 2, wherein the gas passageway is disposed coaxially about the oil passageway within the tool holder body.

4. The tool holder according to claim 1 further comprising a lance seal configured to seal with the oil conduit of the spindle.

5. The tool holder according to claim 1 further comprising a receiver, wherein the lance couples the receiver to the mixing head, wherein the tool holder body defines a gas chamber through which the lance extends.

6. The tool holder according to claim 5, wherein the receiver is mounted within the proximal end of the tool holder body and defines an oil inlet and an gas inlet, the oil inlet being in fluid communication with the lance and configured receive the liquid lubricant from the oil conduit of the spindle and provide the liquid lubricant to the lance via the first terminal end, wherein the gas inlet is in fluid communication with the gas chamber and is configured to receive the gas from a gas conduit of the spindle.

7. The tool holder according to claim 5, wherein the receiver is threadably mounted within the tool holder body.

8. The tool holder according to claim 5, wherein the mixing head defines an aperture that provides fluid communication between the gas chamber and the mixing chamber.

9. The tool holder according to claim 5, wherein the mixing head defines a seat face configured to engage a mating face of a cutting tool.

10. The tool holder according to claim 5, wherein the mixing head is slidably received in the tool holder body.

11. The tool holder according to claim 5, wherein the lance includes a one-way valve.

12. The tool holder according to claim 1, further comprising a nut and a seal member, the seal member forming a seal between the lance and the mixing head, the nut being threadably engaged with the mixing head and configured to compress the seal between the lance and the mixing head to inhibit axial movement of the mixing head relative to the lance.

13. The tool holder according to claim 1 further comprising a one-way valve disposed in the oil passageway.

14. A minimum quantity lubrication (MQL) device comprising the tool holder according to claim 1.

15. A tool holder for a minimum quantity lubrication (MQL) device, the tool holder comprising:
   a tool holder body configured for rotation about an axis, the tool holder body having a proximal end configured to be coupled to a spindle of the MQL device and a distal end configured to support a cutting tool for rotation about the axis;
   a lance including a first terminal end and a second terminal end; and
   a mixing head defining a mixing chamber disposed within the tool holder body,
   wherein the tool holder body defines a gas passageway disposed about the lance within the tool holder body and in fluid communication with the mixing chamber, and
   wherein the lance extends between the first terminal end and the second terminal end to define an oil passageway within the tool holder body and in fluid communication with the mixing chamber, the oil passageway being separate from the gas passageway, wherein the first terminal end is disposed within the tool holder body and is configured to receive a liquid lubricant from an oil conduit of the spindle, the second terminal end and the gas passageway each being open directly into the mixing head so that mixing of gas from the gas passageway and the liquid lubricant from the oil passageway is configured to take place in the mixing chamber.

16. The tool holder according to claim 15 further comprising a receiver coupled to the tool holder body, the receiver defining an oil inlet and a gas inlet, the oil inlet coupling the first terminal end of the lance to an exterior of the receiver, the gas inlet coupling the gas passageway with the exterior of the receiver.

17. The tool holder according to claim 16, wherein the receiver is threadably coupled to the tool holder body.

18. The tool holder according to claim 15, wherein the receiver includes a seal disposed about the first terminal end of the lance and forming a seal between the lance and the receiver.

19. The tool holder according to claim 18, wherein the gas inlet is radially outward of the seal.

* * * * *

UNITED STATES PATENT AND TRADEMARK OFFICE
CERTIFICATE OF CORRECTION

PATENT NO. : 11,370,075 B2  Page 1 of 1
APPLICATION NO. : 16/598437
DATED : June 28, 2022
INVENTOR(S) : David Garrett Coffman, Ethan Timothy Hughey and David Alan Stephenson It is certified that error appears in the above-identified patent and that said Letters Patent is hereby corrected as shown below:

On the Title Page

In the title and In the Specification, Column 1, Lines 1-2, replace "EXPENDED LANCE TOOL HOLDER FOR MINIMUM QUANTITY LUBRICATION" with "EXTENDED LANCE TOOL HOLDER FOR MINIMUM QUANTITY LUBRICATION".

Signed and Sealed this
Thirtieth Day of August, 2022

Katherine Kelly Vidal
*Director of the United States Patent and Trademark Office*